(12) United States Patent
Cavraro et al.

(10) Patent No.: US 11,581,733 B2
(45) Date of Patent: Feb. 14, 2023

(54) SYSTEM STATE ESTIMATION WITH ASYNCHRONOUS MEASUREMENTS

(71) Applicants: Alliance for Sustainable Energy, LLC, Golden, CO (US); The Regents of the University of Colorado, Denver, CO (US)

(72) Inventors: Guido Cavraro, Arvada, CO (US); Andrey Bernstein, Golden, CO (US); Emiliano Dall'Anese, Arvada, CO (US)

(73) Assignees: Alliance for Sustainable Energy, LLC, Golden, CO (US); The Regents of the University of Colorado, a body corporate, Denver, CO (US)

( * ) Notice: Subject to any disclaimer, the term of this patent is extended or adjusted under 35 U.S.C. 154(b) by 115 days.

(21) Appl. No.: 17/096,651

(22) Filed: Nov. 12, 2020

(65) Prior Publication Data
US 2021/0143638 A1 May 13, 2021

Related U.S. Application Data

(60) Provisional application No. 62/934,392, filed on Nov. 12, 2019.

(51) Int. Cl.
*H02J 3/00* (2006.01)
*G06Q 50/06* (2012.01)

(52) U.S. Cl.
CPC ............. *H02J 3/003* (2020.01); *G06Q 50/06* (2013.01); *H02J 3/004* (2020.01); *H02J 2203/20* (2020.01)

(58) Field of Classification Search
CPC .. H02J 3/003; H02J 3/004; H02J 3/144; H02J 13/00004; H02J 2203/20; G06Q 50/06; Y02B 70/3225; Y04S 20/222
See application file for complete search history.

(56) References Cited

U.S. PATENT DOCUMENTS 10,742,068 B2 * 8/2020 de Callafon ............ H02J 3/242
11,169,188 B2 * 11/2021 Bernstein .......... H02J 13/00022
(Continued)

FOREIGN PATENT DOCUMENTS

| CN | 107171327 A | * | 9/2017 | ............... H02J 3/06 |
| CN | 110414787 A | * | 11/2019 | ............. G06Q 10/06 |
| CN | 110796385 A | * | 2/2020 | ............. G06Q 10/06 |
| EP | 2728695 A2 | * | 5/2014 | ............. G01R 31/40 |

OTHER PUBLICATIONS

Machine translation of CN 107171327 A, publ Sep. 15, 2017.*
(Continued)

*Primary Examiner* — M. N. Von Buhr
(74) *Attorney, Agent, or Firm* — Robert G. Pittelkow (57) ABSTRACT

The present disclosure provides techniques for estimating network states using asynchronous measurements by leveraging network inertia. For example, a device configured in accordance with the techniques of the present disclosure may receive electrical parameter values corresponding to at least one first location within a power network and determine, based on the electrical parameter values and a previous estimated state of the power network, an estimated value of unknown electrical parameters that correspond to a second location within the power network. The device may further cause at least one device within the power network to modify operation based on the estimated value of the unknown electrical parameters. The leveraging of network inertia may obviate the need for probabilistic models or pseudo-measurements.

14 Claims, 5 Drawing Sheets

(56) References Cited

U.S. PATENT DOCUMENTS

| | | | |
|---|---|---|---|
| 2007/0096747 A1* | 5/2007 | Wells | G01R 23/04 |
| | | | 324/520 |
| 2014/0032187 A1* | 1/2014 | Legbedji | G06F 17/10 |
| | | | 703/2 |
| 2015/0339419 A1* | 11/2015 | Korobkov | G06F 30/367 |
| | | | 703/2 |
| 2017/0104449 A1* | 4/2017 | Drees | G01W 1/10 |
| 2017/0220708 A1* | 8/2017 | He | G06F 30/20 |
| 2018/0226799 A1* | 8/2018 | Baker | H02J 3/1892 |
| 2020/0150309 A1* | 5/2020 | Dann | G01R 19/2513 |
| 2020/0195393 A1* | 6/2020 | Alsuhaili | H04L 5/0007 |
| 2021/0397762 A1* | 12/2021 | Miao | G06F 30/18 |
| 2022/0113685 A1* | 4/2022 | Cavraro | G06Q 50/06 |

OTHER PUBLICATIONS

Machine translation of CN 110414787 A, publ Nov. 5, 2019.*
Machine translation of CN 110796385 A, publ Feb. 14, 2020.*

Bolognani et al., "State estimation in power distribution networks with poorly synchronized measurements", 53rd IEEE Conference on Decision and Control, Dec. 15-17, 2014, Los Angeles, CA, pp. 2579-2584.
Cavraro et al., "Dynamic Power State Estimation with Asynchronous Measurements", presented at the 2019 IEEE Global Conference on Signal and Information Processing (GlobalSIP), Ottawa, Canada, Nov. 11-14, 2019, NREL/CP-5D00-75064, pp. 1-8.
Cavraro et al., "Online State Estimation for Systems with Asynchronous Sensors", arXiv:2006.00628v1, May 31, 2020, pp. 1-25.
Schenato et al., "Bayesian linear state estimation using smart meters and pmus measurements in distribution grids", 2014 IEEE International Conference on Smart Grid Communications (SmartGridComm), Nov. 3-6, 2014, pp. 572-577.
Song et al., "Dynamic distribution state estimation using synchrophasor data", IEEE Transactions on Smart Grid, Jan. 2020, vol. 11, No. 1, pp. 821-831.
Zhao et al., "A robust iterated extended kalman filter for power system dynamic state estimation", IEEE Transactions on Power Systems, Jul. 2017, vol. 32, No. 4, pp. 3205-3216.

* cited by examiner

SYSTEM STATE ESTIMATION WITH ASYNCHRONOUS MEASUREMENTS

CROSS-REFERENCE TO RELATED APPLICATIONS

This application claims the benefit of U.S. Provisional Application No. 62/934,392, titled "DYNAMIC POWER NETWORK STATE ESTIMATION WITH ASYNCHRONOUS MEASUREMENTS" and filed Nov. 12, 2019, the entire content of which is incorporated herein by reference.

GOVERNMENT LICENSE RIGHTS

This invention was made with government support under Contract No. DE-AC36-08GO28308 awarded by the Department of Energy. The government has certain rights in the invention.

BACKGROUND

In today's world, even modest housing may have photovoltaic (PV) systems and/or wind turbines installed to reduce dependence on the grid, and to offset energy costs. Power generation continues to be increasingly distributed and power networks are becoming larger and more complex. As a result, grid managers may have to deal with increasingly complex systems while maintaining efficiency and quality of service. Further, grid managers may have to do so while relying on existing monitoring infrastructure or on minimal upgrades.

SUMMARY

In one example, a device includes at least one processor configured to receive at least one electrical parameter value corresponding to at least one first location within a power network and determine, based on the at least one electrical parameter value and a previous estimated state of the power network, an estimated value of at least one unknown electrical parameter, wherein the at least one unknown electrical parameter corresponds to a second location within the power network. The at least one processor may be further configured to cause at least one device within the power network to modify operation based on the estimated value of the at least one unknown electrical parameter.

In one example, a method includes receiving, by a power network management system comprising at least one processor, at least one electrical parameter value corresponding to at least one first location within a power network and determining, by the power network management system, based on the at least one electrical parameter value and a previous estimated state of the power network, an estimated value of at least one unknown electrical parameter, wherein the at least one unknown electrical parameter corresponds to a second location within the power network. The method may further include causing, by the power network management system, at least one device within the power network to modify operation based on the estimated value of the at least one unknown electrical parameter.

The details of one or more examples are set forth in the accompanying drawings and the description below. Other features, objects, and advantages will be apparent from the description and drawings, and from the claims.

DETAILED DESCRIPTION

The present disclosure provides systems, devices, and methods capable of accurate system state estimation that can effectively handle asynchronous measurements. The techniques described herein may leverage a linearized system model and the concept of system inertia to update system state iteratively, processing information as it comes in. As one example, the techniques of the present disclosure may be used to estimate real and reactive powers at nodes in a power distribution network each time new information is received about the state of the network, and even when not enough information is received to definitively determine the state of the network. The estimated network state can then be used to manage the network, such as causing components within the network to modify operation.

The integration of renewables, electric vehicles, and other power-electronics-interfaced distributed energy resources (DERs) is leading to net-loading conditions in distribution network that are less predictable and highly variable. In these conditions, recent efforts are looking at revisiting Distribution System State Estimation (DSSE)—a fundamental task for distribution systems operators (DSOs)—to provide estimates of the state at faster time scales. Current industrial and utility practices rely on approaches that produce state estimates at the minute scale (or even every 15 minutes). However, measurements from meters, phasor measurement units (PMUs), and DERs could, in principle, be processed in real time to produce estimates at a faster time scale. Towards this end, a challenge is related to the fact that measurements provided by these devices are generally not synchronized, and the difference between measurement times can be significant. Moreover, due to the limited available bandwidth, sensors do not transmit data to the DSO all at the same time. Rather, data are gathered asynchronously. Consequently, the number of measurements is smaller than the number of state variables at every time step, and hence traditional state estimation algorithms cannot be straightforwardly applied.

In the disclosed techniques, new state estimates are determined as the solution of a strictly convex optimization problem, aiming at minimizing the sum of a weighted least square term capturing the new data and a regularizer that introduces "memory" on the estimate. This momentum or inertia term ensures a consistent estimate, even in the presence of asynchronous measurements. Further, the use of previous state estimates in this way means that one need not rely on probabilistic system models or pseudo-measurements (often derived from such probabilistic models) to reliably estimate current states.

It turns out that the state estimate follows a standard dynamical linear system, having, as an input, the measurements gathered by the DSO. The estimation error is shown to be, in general, always finite and upper bounded when the measurement noise and the grid state variability are limited. Unlike related art methods, however, the techniques described herein do not require a prediction step and can handle asynchronous measurements.

Figure 1:
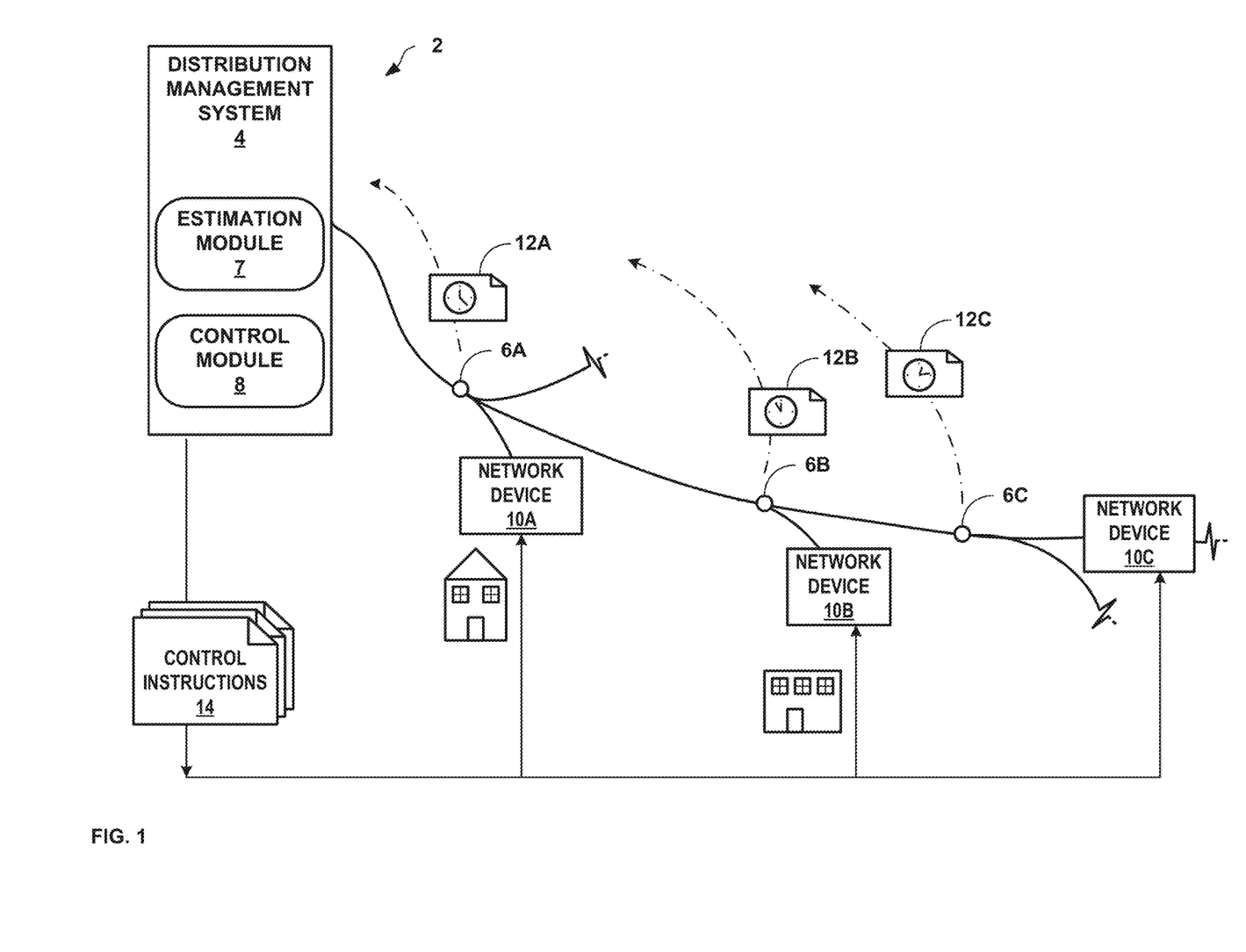
FIG. 1 is a conceptual diagram illustrating an example distribution network management system configured to manage a distribution network using inertia-aware state estimation capable of operation on asynchronous measurements, in accordance with one or more aspects of the present disclosure.

FIG. 1 is a conceptual diagram illustrating an example distribution network management system (e.g., system 4) configured to manage a distribution network (e.g., network 2) using inertia-aware state estimation capable of operation on asynchronous measurements, in accordance with one or more aspects of the present disclosure. In the example of FIG. 1, network 2 includes distribution network management system 4 and nodes 6A-6C (collectively "nodes 6"). Network 2 also includes network devices 10A, 10B, and 10C (collectively "network devices 10"). Distribution network management system 4, nodes 6, and network devices 10 may be interconnected through one or more distribution lines, as illustrated in FIG. 1.

Network 2 represents a simplified power distribution network, and may, in some examples, include any number of additional ones of nodes 6, network devices 10, and/or other components. That is, while shown as having three nodes and three network devices, network 2 may include more or fewer nodes, network devices, and/or other components in other examples. Additionally, FIG. 1 illustrates only one example of a power distribution network management system configured to perform the techniques described herein, and various other systems may be used in accordance with the present disclosure. Furthermore, the techniques described herein may be utilized by devices other than a distribution network management system. For example, the techniques of the present disclosure may, in various examples, be embodied in one or more other devices within a distribution network, in one or more devices of a transmission network, or one or more devices of any other network.

In the example of FIG. 1, nodes 6 represent devices configured to measure values of one or more electrical parameters at a location of network 2 and output electrical parameter values. In various examples, electrical parameters may include real and reactive powers, voltage magnitudes, phases, and/or phasors, current magnitudes, phases, and/or phasors, or any other electrical quantities that provide information about the status of a location in a power network. Nodes 6 may be located at any point in network 2. In some examples, one or more of nodes 6 may be in the middle of a distribution line. In some examples, one or more of nodes 6 may be at a junction of two or more distribution lines. Examples of nodes 6 include smart meters, phasor measurement units, inverters, power substations, and any other systems or devices capable of measuring or determining electrical parameter values at a location in network 2.

In the example of FIG. 1, distribution network management system 4 represents a system configured to manage a power distribution network to provide power to customers. For example, network 2 shown in FIG. 1 may be connected to a power transmission network (not shown). Distribution network management system 4 may manage the receipt and distribution of power from the transmission network while avoiding overloading network 2 and ensuring that customers' power needs are met.

In some examples, distribution network management system 4 may represent a system owned and operated by a utility company, also known as a distribution system operator (DSO). In other examples, distribution network management system 4 may be owned and/or operated by another entity. For instance, distribution network management system 4 may represent an access point of a power network of a business park or corporate campus. As another example, distribution network management system 4 may manage a micro-grid, such as may be employed on a military base, mobile hospital, or other small area in which electrical power may be desirable. In other words, distribution network management system 4 may represent any system configured to manage power distribution via a power distribution network.

Distribution network management system 4 may be a computing device, such as a server computer, a desktop computer, or any other device capable of implementing some or all of the techniques described herein. In some examples, distribution network management system 4 may represent a cloud computing environment. That is, while shown as a single component in the example of FIG. 1, distribution network management system 4 may, in other examples, be a group of distributed computing resources that communicate with one another.

As shown in the example of FIG. 1, distribution network management system 4 includes estimation module 7 and control module 8. Estimation module 7 may represent a combination of software and/or firmware and hardware that is configured to estimate unknown electrical parameters in a system based on known electrical parameters of the system, in accordance with the techniques described herein. Control module 8 may represent a combination of software and/or firmware and hardware that is configured to cause one or more devices within network 2 to modify operation based on electrical parameters of network 2.

In the example of FIG. 1, network devices 10 represent electrical components within network 2 that are operable to modify their operation. Examples of network devices 10 include power generation sources, power inverters (e.g., that connect photovoltaic devices to network 2), controllable loads (e.g., energy storage systems, industrial equipment, etc.), connection devices (e.g., switching gear, etc.), curtailable loads, and any other equipment that may be operated to manage a power network.

Nodes 6, in the example of FIG. 1, may measure respective electrical parameter values 12A-12C (collectively "electrical parameter values 12") on an iterative basis. Each electrical parameter value may represent the present value of the electrical parameter at a particular location in network 2. In accordance with the techniques described herein, nodes 6 may output electrical parameter values 12. In the example of FIG. 1, for instance, nodes 6 may transmit electrical parameter values 12 to distribution network management system 4 using wireless and/or wired communication. In other examples, nodes 6 may additionally or alternatively transmit electrical parameter values 12 to one or more other components of network 2. In various examples, one or more of nodes 6 may measure and/or transmit electrical parameter values at different times. For instance, in the example of FIG. 1, nodes 6A, 6B, and 6C may respectively transmit electrical parameter values 12A, 12B, and 12C at two or more different times. The difference in timing may be due to different components, to communications issues, or for any other reason.

In accordance with the techniques described herein, distribution network management system 4 may receive at least one electrical parameter value corresponding to at least one first location within a power network. For instance, distribution network management system 4 may receive electrical parameter values 12A corresponding to the location of node 6A. However, as shown in the example of FIG. 1, distribution network management system 4 may not receive electrical parameter values 12B and 12C at the same time. In some examples, distribution network management system 4 may not receive electrical parameter values for a certain node at all. That is, in some examples, a device configured to measure and send electrical parameter values may malfunction and fail to send electrical parameter values. In some examples, there may not be any device at a particular location within network 2 that is operable to measure or send electrical parameter values, but it may still be desirable to determine electrical parameter values for such location. In some examples, distribution network management system 4 may receive electrical parameter values, but the values may be corrupted, clearly inaccurate, or otherwise unusable. That is, in some examples distribution network management system 4 may receive parameter values but be unable to use the values for some reason.

Distribution network management system 4 may determine, using inertia-aware state estimation and based on the at least one electrical parameter value, an estimated value of at least one unknown electrical parameter. The at least one unknown electrical parameter may correspond to a second location within the power network. For instance, estimation module 7 of distribution network management system 4 may receive electrical parameter values 12A. Based on the received electrical parameter values, estimation module 7 may estimate one or more electrical parameter values that correspond to the location of node 6B and/or node 6C using the inertia-aware state estimation techniques described herein. As further described herein, estimation module 7 does not need to rely on probabilistic models of network 2 or on pseudo-measurements for electrical parameter values within network 2 when determining unknown electrical parameters. That is, the techniques of the present disclosure may provide accurate state estimation without the need for probabilistic models or pseudo-measurements, as used in related-art techniques.

Distribution network management system 4 may cause at least one device within the power network to modify operation based on the estimated value of the at least one unknown electrical parameter. For instance, control module 8 may receive electrical parameter values 12A and receive the estimated electrical parameter values that correspond to the location of node 6B and/or node 6C. Based on these received values, control module 8 may output control instructions 14 that may cause one or more of network devices 10 to modify operation.

In various examples, distribution network management system 4 may cause devices within network 2 to modify operation based on the estimated electrical parameter values corresponding to the location of node 6B and/or node 6C through various means. As one specific example, distribution network management system 4 may be configured to operate in conjunction with other devices in network 2 to seek OPF-based targets through gather and broadcast techniques. That is, distribution network management system 4 may receive one or more electrical parameter values of network 2 (e.g., from nodes 6), estimate values for one or more unknown electrical parameters of network 2 using the techniques described herein, determine setpoint coefficients for various devices in network 2, and output the coefficients to the devices in network 2 (e.g., network devices 10) to cause the devices to modify operation based at least in part on the estimated values for the one or more unknown electrical parameters. As another specific example, distribution network management system 4 may output the estimated electrical parameter values corresponding to the location of node 6B and/or node 6C to distribution system operators, receive input with instructions on how to manage network 2, and act on such instructions, thereby causing devices within network 2 to modify operation based on the estimated electrical parameter values. As another example, distribution network management system 4 can use the estimated electrical parameter values and some other historical data to forecast and predict the behavior of the distribution network. As yet another example, distribution network management system 4 can use the estimated electrical parameter values to estimate/detect failures and attacks on the grid.

Distribution network management system 4 may, later, again receive at least one electrical parameter value corresponding to a location within the power network. For instance, distribution network management system 4 may receive electrical parameter values 12B or 12C corresponding to the location of nodes 6B or 6C, respectively. Distribution network management system 4 may again determine, using inertia-aware state estimation and based on the received electrical parameter value(s), an estimated value of at least one currently unknown electrical parameter. For instance, estimation module 7 of distribution network management system 4 may receive electrical parameter values 12B and estimate electrical parameter values that correspond to the location of node 6A and/or 6C using the inertia-aware state estimation techniques described herein.

While certain operations are described in the example of FIG. 1 as being performed by distribution network management system 4, these operations may, in other examples, be performed by one or more other components of network 2, or by components not shown in FIG. 1. In some examples, for instance, each of nodes 6 and/or network devices 10 may be configured to electrical parameter values 12, determine estimated values of unknown electrical parameters, and modify their own operation based on the estimated electrical parameter values. In yet another example, some of these operations may be performed by one or more standalone computing devices (not shown) that communicate with the other components of network 2. This may be the case when, for example, one or more of the components within network 2 are legacy devices that do not have sufficient computing power or communications abilities.

Distribution network management system 4 may receive electrical parameter values and cause devices to modify operation in an iterative fashion that allows system 2 to seek OPF targets in real-time or near-real-time. That is, the techniques described herein may be performed on a relatively fast time scale, thereby allowing more efficient operation when pursuing operating targets (e.g., avoiding physical constraints and other management or consumer objectives). As one example, distribution network management system 4 may perform state estimation each time new measurements are received. In the example of FIG. 1, for instance, if distribution network management system 4 later receives electrical parameter values 12B from any of nodes 6A, 6B, or 6C, distribution network management system 4 may perform the inertia-aware state estimation techniques described herein to estimate values for the other, currently-unknown electrical parameter values, such as those at nodes 6B and 6C, 6A and 6C, or 6A and 6B, respectively.

In some examples, distribution network management system 4 may additionally or alternatively perform the inertia-aware state estimation techniques described herein at some regular frequency. For instance, distribution network management system 4 may perform such state estimation operations every second, every millisecond, or at some other interval, using measurements received within that interval. In the context of FIG. 1, for example, if distribution network management system 4 additionally or alternatively performs the techniques of the present disclosure every minute, distribution network management system 4 may determine, every minute, whether any measurements were received. If no measurements were received, distribution network management system 4 may not do anything, or may perform other operations outside the scope of this disclosure. If measurements were received, distribution network management system 4 may perform the techniques described herein using all of the measurements received. Additionally, in some examples, different components of system 2 may perform operations at different intervals while in other examples, all components of system 2 may generally perform the operations described herein with the same frequency.

In some examples wherein distribution network management system 4 performs the techniques described herein in a periodic fashion, distribution network management system 4 may determine estimated electrical parameter values for unknown electrical parameters each iteration. This may be the case, for instance, when a location in network 2 is incapable of measuring and providing such parameter values. In some examples, distribution network management system 4 may not determine estimated electrical parameter values for unknown electrical parameters on each iteration. As one specific example, if distribution network management system 4 receives all information expected or determines that it has sufficient information to fully represent a state of network 2, distribution network management 4 may not determine the estimated values in that iteration. As another specific example, distribution network management system 4 may only determine estimated values periodically (e.g., every other iteration, every five iterations, or with some other frequency).

By allowing for use of information received asynchronously to determine estimated values of unknown electrical parameters in a power network, the techniques of the present disclosure may allow for more consistent real-time network management by obviating the need for complete information with every iteration. By avoiding the need for probabilistic models or pseudo-measurements, the techniques described herein may avoid unnecessary processing and more quickly and efficiently estimate current states. Furthermore, by causing devices within network 2 to modify operation based on estimated values, the low-observability matrix completion techniques described herein may provide more efficient performance of power networks. This, in turn, may reduce costs to network managers and ensure more resilience for consumers.

The mathematical development of the inertia-aware state estimation techniques described herein is detailed below, using the following notation: Lower- (upper-) case boldface letters denote vectors (matrices). Calligraphic symbols are reserved for sets. Vectors $e_m$, 1, and 0 are the m-th canonical vector, the all-one vectors, and the all-zero vector of suitable dimension. Matrices $I_N$ and $0_N$ represent the identity matrix and the square matrix whose entries are all zero of dimension N. Given a vector x, $\|x\|$ denotes the $\ell_2$-norm and dg(x) the matrix whose diagonal is x; given a symmetric positive-definite matrix R, $\|x\|_{R^{-1}}^2$ is the weighted squared norm $x^T R^{-1} x$. Given a set of matrices $\{X_i\}_{i=1}^T$, $bdg(\{X_i\}_{i=1}^T)$ is the block diagonal matrix having the $X_i$'s as blocks in the diagonal. The eigenvalues of a matrix X are collected in the set eig(X).

As a distribution network model, a radial power distribution grid having N+1 buses can be modeled by a graph $\mathcal{G}_o = (\mathcal{N}, \mathcal{L})$. Nodes in $\mathcal{N} := \{0, \ldots, N\}$ represent grid buses, and the edges in $\mathcal{L}$ correspond to the L distribution lines. The active and the reactive power injection at bus n are denoted by $p_n$ and $q_n$, while its voltage magnitude and its voltage phase as $v_n$ and $\theta_n$. The substation bus is indexed by n=0 and it is modeled as a slack bus whose voltage is fixed at $v_0=1$ and $\theta_0=0$. Every other bus n is modeled as a constant power or P-Q bus.

Powers corresponding to loads (generators) are such that $p_n \leq 0$ ($p_n \geq 0$). The voltage magnitudes, voltage angles and power injections at all buses excluding the substation are collected in the vectors v, θ, p, q $\in \mathbb{R}^N$. Let $r_\ell + ix_\ell$ be the impedance of line $\ell$, and collect all the impedances in vector r+ix. The grid connectivity is captured by the branch-bus incidence matrix $\tilde{A} \in \{0, \pm 1\}^{L \times (N+1)}$ that can be partitioned into its first and the rest of its columns as $\tilde{A} = [a_0 \ A]$. The reduced bus admittance matrix $Y \in \mathbb{C}^{N \times N}$ is defined as $Y := A^T dg(r+ix)^{-1} A$; Y is symmetric, positive semidefinite and, if the network is connected, invertible. Power injections are non-linearly related to nodal voltage phasors. However, after linearizing complex power injections around the flat voltage profile 1+j0, the bus voltage deviations $\tilde{v} := v - 1$ and the bus voltage angles can be approximated by $$\begin{bmatrix} \tilde{v} \\ \theta \end{bmatrix} = \begin{bmatrix} R & X \\ X & -R \end{bmatrix} \begin{bmatrix} p \\ q \end{bmatrix} \quad (1)$$

where $R := (real(Y))^{-1}$, $X := (imag(Y))^{-1}$. Trivially, from (1) it follows that $$\begin{bmatrix} \tilde{v} \\ \theta \\ p \\ q \end{bmatrix} = \begin{bmatrix} R & X \\ X & -R \\ I_N & 0_N \\ 0_N & I_N \end{bmatrix} \begin{bmatrix} p \\ q \end{bmatrix} = \Phi \begin{bmatrix} p \\ q \end{bmatrix}. \quad (2)$$

where the matrix $\Phi \in \mathbb{R}^{4N \times 2N}$ is introduced. In other words, $\Phi$ houses a linearization of the power flow equations which represent how power flows in the distribution network. It should be noted that, in some examples, power flow in the network may change over time in a way that necessitates a change in the linearized power flow representation. For example, the system topology might change, changing the relation between nodal powers and voltages, too. Hence the linearized power flow equations may need to change accordingly. Thus, hereafter, $\Phi$ is referred to as $\Phi_k$ to denote its temporal dependency.

In the present disclosure, it is assumed that two kinds of metering devices are used: conventional smart meters, able to measure power injections and voltage magnitudes, and PMUs, able to measure power injections and both voltage magnitudes and angles. It should be noted, however, that the techniques described herein may be used with trivial modifications to accommodate various other devices configured to provide various electrical parameter values. Buses endowed with smart meters are collected in the set $\mathcal{M}_{SM}$, while buses endowed with PMUs in the set $\mathcal{M}_{PMU}$. Let $\{t_k\}_{k\geq 1}$ be the times at which the DSO receives field data. Precisely, at time $t_k$, the DSO gathers measurements from a subset of buses, collected in the set $\mathcal{S}(k)$. Without loss of generality, it's also assumed that, at each time $t_k$, measurements from $\mathcal{S}$ buses are retrieved and stacked in the vector $y(k)$, i.e., $\mathcal{S}(k)=\{s_1(k), \ldots, s_S(k)\}$. Then, $$y(k)=S(k)[\tilde{v}^T(k)\theta^T(k)p^T(k)q^T(k)]^T+n(k) \quad (3)$$

where $n(k)$ represents measurement noise and where $S(k)$ is a selection matrix that picks from the vector $[\tilde{v}^T(k)\ \theta^T(k)\ p^T(k)\ q^T(k)]^T$ the quantities measured at time $t_k$. Matrix $S(k)$ can be written as $$S(k)=[S_{s_1}^T \ldots S_{s_S}^T]^T$$

where every $S_{s_n}$ can be defined in two ways:
if $s_n \in \mathcal{M}_{SM}$, then $S_{s_n} \in \{0,1\}^{3\times 4N}$ $$S_{s_n} = \begin{bmatrix} e_{s_n}^\top & 0^\top & 0^\top & 0^\top \\ 0^\top & 0^\top & e_{s_n}^\top & 0^\top \\ 0^\top & 0^\top & 0^\top & e_{s_n}^\top \end{bmatrix} \quad (4)$$

if $s_n \in \mathcal{M}_{PMU}$, then $S_{s_n} \in \{0,1\}^{4\times 4N}$ $$S_{s_n} = \begin{bmatrix} e_{s_n}^\top & 0^\top & 0^\top & 0^\top \\ 0^\top & e_{s_n}^\top & 0^\top & 0^\top \\ 0^\top & 0^\top & e_{s_n}^\top & 0^\top \\ 0^\top & 0^\top & 0^\top & e_{s_n}^\top \end{bmatrix} \quad (5)$$

Denote the size of $y(k)$, i.e., the number of measurements that arrive at every time, as $M_k$. The value of $M_k$ varies as a function of the type of reporting metering devices. For instance, if at time $t_k$ the DSO gathers measurements from C buses in $\mathcal{M}_{SM}$ and from S–C buses in $\mathcal{M}_{PMU}$, then $M_k$=3C+4(S–C). In a synchronous setting, $S(k)$ would be constant over time. Finally, the measurement noise $n(k)$ is assumed to be zero-mean with diagonal covariance $N_k$.

With the distribution network model defined, the present disclosure provides techniques for estimating the state of the grid exploiting the measurements gathered from S buses. Nodal power injections constitute the state of the grid, described by the vector $x \in \mathbb{R}^{2N}$, $x:=[p^T\ q^T]^T$. Let the state of the network at time $t_k$ be denoted as $x(k)$. By combining (2) and (3), the following linear measurement model is obtained $$y(k)=S(k)\Phi_k x(k)+n(k). \quad (6)$$

Recall that measurements are processed as they come in, and that $y(k)$ carries information of a limited number of buses. The following assumption can be made on measurements acquisition.

Assumption 1. There exists a constant $\tau>0$ such that the DSO gathers measurements from every bus n at least once in the interval $[t_k, t_{k+1}, \ldots t_{k+\tau}]$, for every $k=1, 2, \ldots$.

Denote by $\hat{x}(k)$ the estimate of the grid state at time $t_k$. The DSO update the state estimate after the new set of measurement $y(k)$ arrives. Precisely, the new estimate is chosen as the solution of the optimization problem $$\hat{x}(k) = \underset{w}{\mathrm{argmin}} \|y(k) - S(k)\Phi_k w\|_{N_k^{-1}}^2 + \gamma \|w - \hat{x}(k-1)\|^2 \quad (7)$$

where $\gamma>0$ is the inertia parameter. Note that
- the first term of the cost in (7) is a classical weighted linear least square term. However, it is not necessarily strictly convex, e.g., consider the targeted case when the number of measurements $M_k$ is smaller than the state size 2N. Hence, if $\gamma=0$, i.e., if the second term is neglected, problem (7) may have infinite solutions.
- the second term of the cost in (7) acts as a regularizer which penalizes the Euclidean distance of the new estimate from the older one. The regularizer makes (7) a strictly convex problem and hence $\hat{x}(k)$ well defined.
- the smaller the inertia parameter $\gamma$ is, the further the new estimate $\hat{x}(k)$ is allowed to be from $\hat{x}(k-1)$.
- task (7) is an unconstrained optimization problem. In some cases, prior information can be leveraged to restrict the state space, e.g., by adding constraints, and improve the estimation accuracy.

Note that the new estimate can be explicitly written as $$\hat{x}(k) = \Lambda(k)\hat{x}(k-1) + \frac{1}{\gamma}\Lambda(k)\Phi_k^T S(k)^T N_k^{-1} y(k) \quad (8)$$

where $$\Lambda(k)=\gamma(\Phi_k^T S(k)^T N_k^{-1} S(k)\Phi_k+\gamma I)^{-1}. \quad (9)$$

Matrix $\Lambda(k)$ is always symmetric and positive definite.

Importantly, (7), (8), and (9) do not rely on a probabilistic model of the network or on pseudo-measurements for unknown quantities. As the term is used herein, a probabilistic model is one which provides a statistics-based description of electrical parameter values within the network. As one example, a simple probabilistic model of a distribution network may specify estimated electrical parameter values within the network and a variance for such values, determined based on historical electrical parameter values and other information such as time of day, date, cloud cover, or other attributes. As another example, a probabilistic model could be the probability density function or the cumulative distribution function of power load, generation capabilities, or nodal voltages. Pseudo-measurements, as the term is used herein, are estimates of unknown electrical parameter values determined based on such statistical representations. The techniques of the present disclosure do not need to rely on such statistical models or measurements estimated therefrom.

Figure 2:
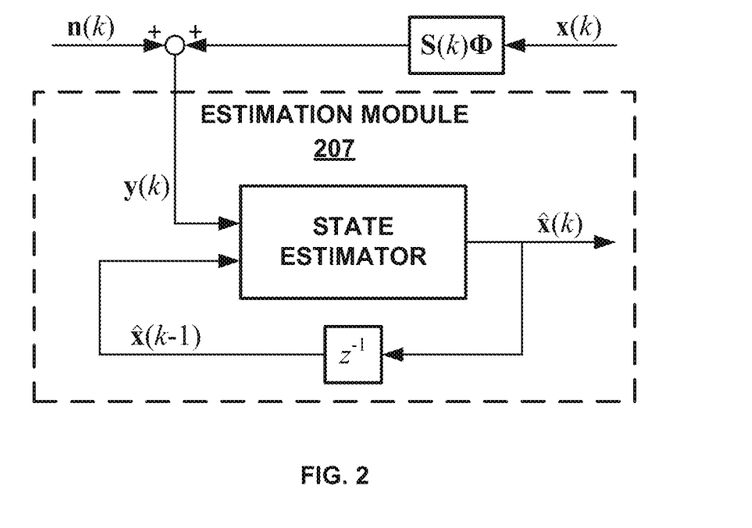
FIG. 2 is block diagram illustrating an example dynamical system for inertia-aware state estimation capable of operation on asynchronous measurements, in accordance with one or more aspects of the present disclosure.

FIG. 2 is block diagram illustrating an example dynamical system for inertia-aware state estimation capable of operation on asynchronous measurements, in accordance with one or more aspects of the present disclosure. The example of FIG. 2 includes estimation module 207. Estimation module 207 represents another example of a module configured to estimate system state information based in part on system inertia. Estimation module 207 may operate substantially similarly to estimation module 7 as depicted in FIG. 1. Specifically, FIG. 2 depicts a block scheme of equations (6) and (8), which represent a linear dynamical system. Note that equation (8) is essentially a classic closed-loop system, represented by the dashed area in FIG. 2. Such system features the ensuing stability property, proved in brief below.

Proposition 1. Let Assumption 1 hold. Define the state variation $\Delta(k)=x(k)-x(k-1)$, the estimation error $\xi(k)=\hat{x}(k)-x(k)$, and the scalar values $$\sigma = \max_k \{\lambda \in eig(\Lambda(k)), \lambda \neq 1\}.$$

Then, 1) the system (8) is asymptotically stable. In particular, $\sigma<1$ and, for $k\geq 1$, $$\|\hat{x}(k+\tau)\| \leq \sigma \|\hat{x}(k)\| \tag{10}$$

2) the system (8) is bounded input bounded output (BIRO) stable 3) if the state variation norm and the measurement noise norm are upper-bounded, i.e., $\|\Delta(k)\|\leq \delta_x$, $\|n(k)\|\leq \delta_n$, $\forall k$, the estimation error satisfies $$\lim_{k\to\infty} \|\xi(k)\| \leq \tau\left(\delta_x + \frac{c}{\gamma}\delta_n\right)\left(1 + \frac{\gamma}{\sigma}\right). \tag{11}$$

The error upper bound in (11) is minimized by $$\gamma^* \leq \sqrt{\frac{\sigma c \delta_n}{\delta_x}}.$$

Proposition 1-2) implies that if the sequence of measurements $\{y(k)\}_k$ is bounded, then the sequence of estimates $\{\hat{x}(k)\}_k$ does not diverge. On the other hand, Proposition 1-3) upper bounds the estimation error when state variation and measurement norm are bounded. Note that the latter scenario includes the case in which n is stochastic with limited support, e.g., n is a random vector drawn from a uniform distribution or drawn from a truncated Gaussian distribution.

Figure 3:
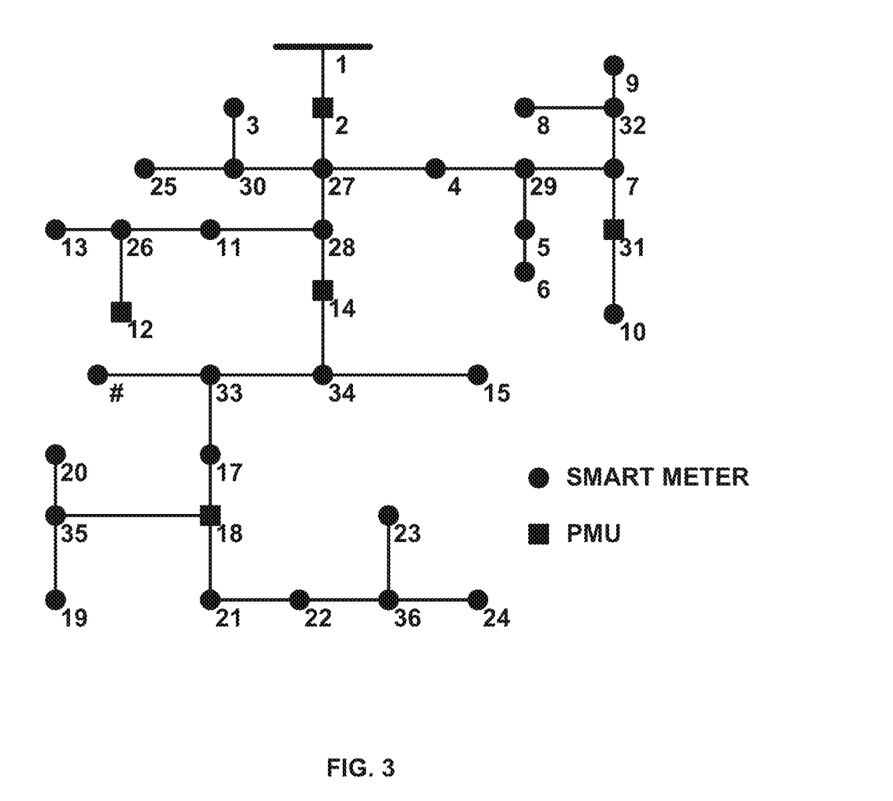
FIG. 3 is a schematic representation illustrating the IEEE 37-bus test feeder converted to its single-phase equivalent.

FIG. 3 is a schematic representation illustrating the IEEE 37-bus test feeder converted to its single-phase equivalent. The techniques disclosed herein were validated on the feeder depicted in FIG. 3. Measurements were taken from the devices and gathered from the system operator once every 10 seconds. Loads were generated by adding a zero-mean Gaussian variation to the benchmark data, with standard deviation 0.22 times the nominal loads. Voltages were obtained via a power flow solver and then corrupted by a truncated zero-mean Gaussian noise with $3\sigma$ deviation of 1% per unit (pu). Every bus in the network was endowed either with a smart meter or with a PMU as shown in FIG. 3. The techniques of the present disclosure were tested for different values of the inertia parameter $\gamma$ and for different numbers of reporting metering devices S. Each scenario was studied through 200 Monte Carlo simulations. The state estimate was always initialized at $\hat{x}(0)=0$. The S reporting devices were randomly chosen at each algorithm iteration. However, every device was forced to report data at least once every 100 iterations. Define the average relative estimation error e(k) as the average computed over the Monte Carlo simulations of the relative estimation error, i.e., $e(k)=\log(\mathbb{E}[\|\xi(k)\|/\|x(k)\|])$.

Figure 4:
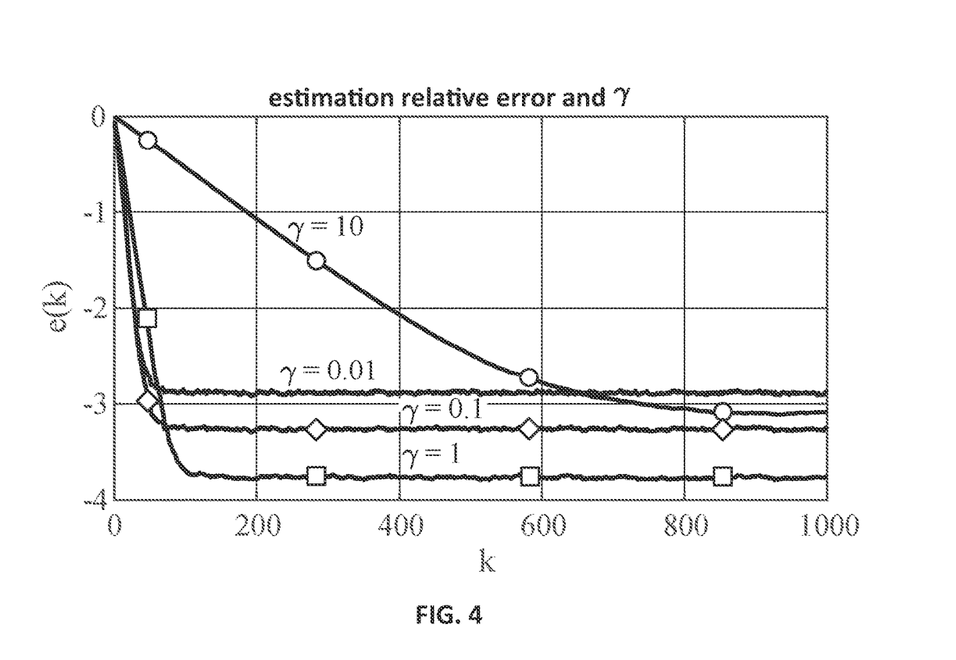
FIG. 4 is a graphical plot illustrating average estimation errors over time of inertia-aware state estimation capable of operation on asynchronous measurements, in accordance with one or more aspects of the present disclosure.

FIG. 4 is a graphical plot illustrating average estimation errors over time of inertia-aware state estimation capable of operation on asynchronous measurements, in accordance with one or more aspects of the present disclosure. In particular, FIG. 4 depicts e(k) for different values of the inertia parameter $\gamma$, when S=4. In general, the smaller $\gamma$ is, the faster the algorithm error reaches its asymptotic value. With regard to the asymptotic error, the best performance is obtained when $\gamma=1$. This can be better understood by looking at FIG. 5.

Figure 5:
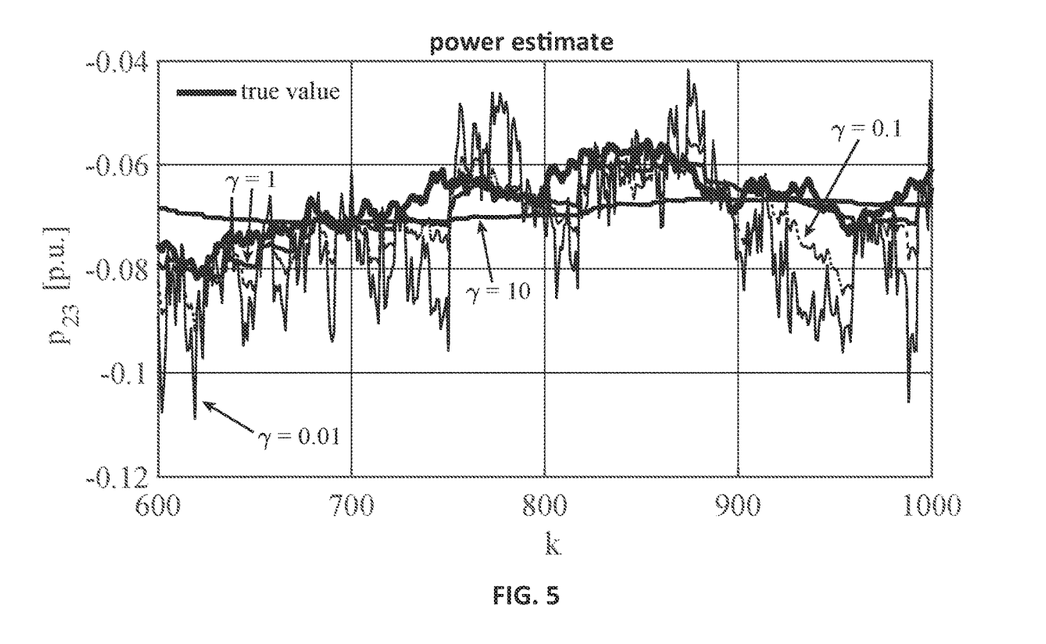
FIG. 5 is a graphical plot illustrating power estimates over time for a particular test using inertia-aware state estimation capable of operation on asynchronous measurements, in accordance with one or more aspects of the present disclosure.

FIG. 5 is a graphical plot illustrating power estimates over time for a particular test using inertia-aware state estimation capable of operation on asynchronous measurements, in accordance with one or more aspects of the present disclosure. In particular, FIG. 5 compares the active power absorbed by bus 23 (denoted as $p_{23}$) with its estimates (denoted by $\hat{x}_{23}$) in one of the Monte Carlo runs for different values of $\gamma$. When $\gamma\gg 1$, the regularizer term in (6) is dominant. Hence $\hat{x}_{23}(k)$ is forced to be close to the old estimate $\hat{x}_{23}(k-1)$ and is slowly chasing the state $p_{23}$. On the other hand, when $\gamma<1$, FIG. 5 shows high fluctuations of $\hat{x}_{23}(k)$. In fact, the estimate becomes more sensitive to measurement noise.

Figure 6:
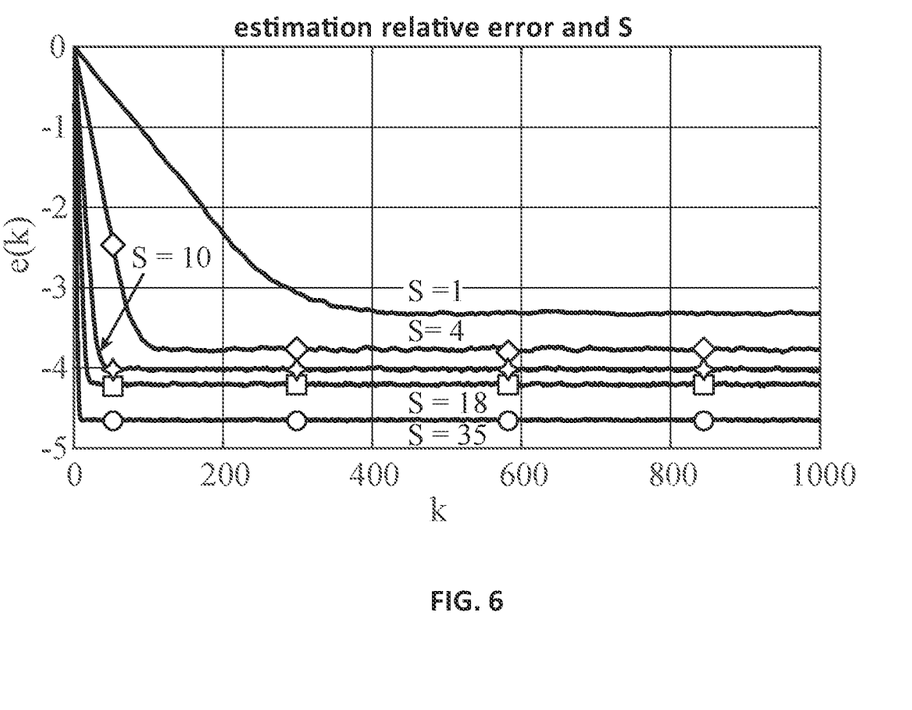
FIG. 6 is a graphical plot illustrating average estimation errors over time of inertia-aware state estimation capable of operation on asynchronous measurements, in accordance with one or more aspects of the present disclosure.

FIG. 6 is a graphical plot illustrating average estimation errors over time of inertia-aware state estimation capable of operation on asynchronous measurements, in accordance with one or more aspects of the present disclosure. In particular, FIG. 6 shows how the state estimation techniques described herein perform for different numbers of reporting meters S, when $\gamma=1$. Not surprisingly, the bigger S is, the better the performance.

The proof of Proposition 1 uses the following Lemma and, for brevity, is only sketched here.

Lemma 1. Let Assumption 1 hold. Then, $$\cap_{j=0}^{\tau} ker(S(k+j)\Phi_k)=0. \tag{12}$$

Proof of Proposition 1: Firstly, heed that, with $\Phi_k^T S(k)^T N_k^{-1} S(k)\Phi_k$ being a symmetric positive-semidefinite matrix, it can be written as $$\Phi_k^T S(k)^T N_k^{-1} S(k)\Phi_k = [U(k)V(k)]bdg(\Sigma(k), 0_{N-M})[U(k)V(k)]^T$$

where $\Sigma(k)$ is the diagonal matrix collecting the eigenvalues of $\Phi_k^T S(k)^T N_k^{-1} S(k)\Phi_k$. Columns of V(k) are eigenvectors spanning $ker(\Phi_k^T S(k)^T N_k^{-1} S(k)\Phi_k)=ker(S(k)\Phi_k)$. Then, it follows that $$\Lambda(k)=[U(k)V(k)]bdg(\tilde{\Sigma}k), I_{N-M})[U(k)V(k)]^T \tag{13}$$

where $$\tilde{\Sigma}(k)=\gamma(\gamma I+\Sigma(k))^{-1}. \tag{14}$$

Note that $\tilde{\Sigma}(k)$ is a diagonal matrix whose entries are positive and strictly lower than 1, and $$\sigma = \max_k eig(\tilde{\Sigma}(k)).$$

Matrix V(k) collects all the eigenvectors of $\Lambda(k)$ associated with the eigenvalue 1. Given any $\hat{x}(k)$, $$\hat{x}(k+\tau) = \prod_{j=k}^{k+\tau}\Lambda(j)\hat{x}(k) = \prod_{j=k}^{k+\tau}[U(j)V(j)]bdg(\tilde{\Sigma}(j), I_{N-M})[U(j)V(j)]^T\hat{x}(k). \tag{15}$$

Since Assumption 1 and Lemma 1 implies that $$\Pi_{j=k}^{k+\tau}V(j)V(j)^T=0_N, \tag{16}$$

by combining equations (15) and (16), and by exploiting the properties of norms, one can obtain $$\|\Pi_{j=k}^{k+\tau}\Lambda(j)\|\leq\sigma \quad (17)$$

from which equation (10) follows.

Concerning the BIRO stability, note that, iterating equation (8) yields $$\hat{x}(T)=\Pi_{k=1}^{T}\Lambda(k)\hat{x}(0)+\gamma^{-1}\Sigma_{k=1}^{T}\Pi_{j=k}^{T}\Lambda(j)\Phi_{k}^{T}S(j)^{T}$$
$$N_{j}^{-1}y(j). \quad (18)$$

Let $$y_{max} = \max_{k}\{\gamma^{-1}\|y(k)\|\}.$$

The triangle inequality applied to (18) yields $$\|\hat{x}(T)\| \leq \left\|\prod_{k=1}^{T}\Lambda(k)\right\|\|\hat{x}(0)\| + y_{max}\sum_{k=1}^{T}\left\|\prod_{j=k}^{T}\Lambda(j)\right\| \leq \quad (19)$$

$$\|\hat{x}(0)\| + y_{max}\rho\tau\sum_{i=0}^{\mu}\sigma^{i} \leq \|\hat{x}(0)\| + y_{max}\rho\tau\frac{1}{1-\sigma}$$

where $$\mu = \mathrm{mod}\,(T/\tau) \text{ and } \rho = \max_{k}\left\|\Phi_{k}^{T}S(k)^{T}N_{k}^{-1}\right\|.$$

Equation (11) can be obtained by making T in (19) tending to infinity and by using (6) and (10). Finally, equation (12) is derived by setting the derivative of (11) to zero.

Figure 7:
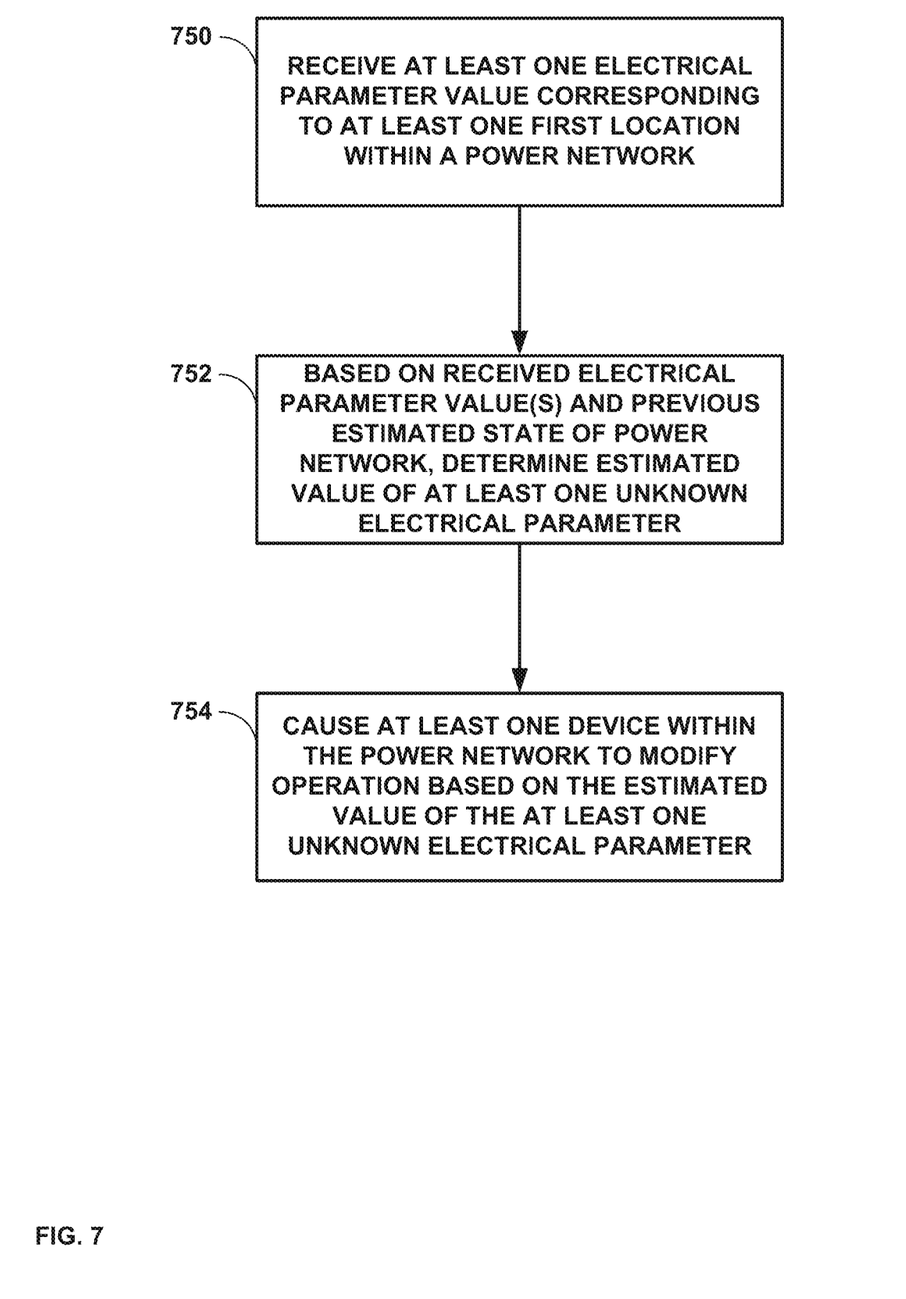
FIG. 7 is a flow diagram illustrating example operations for performing network management using inertia-aware state estimation, in accordance with one or more aspects of the present disclosure.

FIG. 7 is a flow diagram illustrating example operations for performing network management using inertia-aware state estimation, in accordance with one or more aspects of the present disclosure. FIG. 7 represents only one example process for performing network management using inertia-aware state estimation, and various other or additional operations may be used in other examples. The example operations of FIG. 7 are described below within the context of FIG. 1.

In the example of FIG. 7, a distribution network management system may receive at least one electrical parameter value corresponding to at least one first location within a power network (750). Distribution network management system 4, for instance, may receive electrical parameter values 12A.

The distribution network management system may determine, based on the at least one electrical parameter value and a previous estimated state of the power network, an estimated value of at least one unknown electrical parameter (752). The at least one unknown electrical parameter may correspond to a second location within the power network. For instance, distribution network management system 4 may utilize the inertia-aware state estimation techniques detailed herein to determine an estimated electrical parameter value corresponding to the location of node 6B and/or the location of node 6C.

In the example of FIG. 7, the distribution network management system may cause at least one device within the power network to modify operation based on the estimated value of the at least one unknown electrical parameter (754). For instance, distribution network management system 4 may generate control instructions 14 based at least in part on the estimated electrical parameter value. Distribution network management system 4 may output control instructions 14 to network devices 10, thereby causing one or more of network devices 10 to modify its operation.

In some examples, the example operations of FIG. 7 may be performed in an iterative fashion. That is, while only a single flow is shown, each of operations 750, 752, and/or 754 may be performed any number of times. In some examples, the operations may be performed in an as-needed fashion. For instance, operations 752 and/or 754 may performed in response to receiving new/additional electrical parameter values, such as electrical parameter values 12B from node 6B or 12C from node 6C. In some examples, the operations may additionally or alternatively be performed periodically. For instance, operations 752 and/or 754 may be performed every minute (or every 5 minutes, or at any other frequency), using all electrical parameter values received during the preceding minute. If no new electrical parameter values were received, operations 752 and/or 754 may not be performed.

While generally described herein within the context of a power distribution network, the techniques of the present disclosure may be beneficial in various other contexts where real-time or near-real-time knowledge of dynamical system state is important. For example, state estimation may play a role in various large-scale engineering systems, such as traffic systems, and communication networks. It is useful for monitoring purposes and to support underlying control and optimization tasks. As one particular example, in traffic networks, traffic flows and vehicle densities in highways and roads are monitored and may be used for congestion control.

The techniques of the present disclosure may additionally or alternatively be described by one or more of the following examples.

Example 1. A device comprising: at least one processor configured to: receive at least one electrical parameter value corresponding to at least one first location within a power network; determine, based on the at least one electrical parameter value and a previous estimated state of the power network, an estimated value of at least one unknown electrical parameter, wherein the at least one unknown electrical parameter corresponds to a second location within the power network; and cause at least one device within the power network to modify operation based on the estimated value of the at least one unknown electrical parameter.

Example 2. The device of example 1, wherein determining the estimated value of the at least one unknown electrical parameter is without use of a probabilistic model of the network or use of pseudo-measurements of current electrical parameters.

Example 3. The device of any of examples 1-2, wherein determining the estimated value of the at least one unknown electrical parameter is based further on a linearization of power flow equations which represents how power flows in the power network.

Example 4. The device of any of examples 1-3, wherein determining the estimated value of the at least one unknown electrical parameter is further based on a respective at least one weighting value that represents the accuracy of the at least one electrical parameter value.

Example 5. The device of any of examples 1-4, wherein determining the estimated value of the at least one unknown electrical parameter comprises determining respective active and reactive power values for nodes in the power network.

Example 6. The device of any of examples 1-5, wherein receiving the at least one electrical parameter value comprises receiving a voltage magnitude, a real power value, and a reactive power value, each corresponding to the at least one first location.

Example 7. The device of any of examples 1-6, wherein receiving the at least one electrical parameter value comprises receiving a voltage angle corresponding to the at least one first location.

Example 8. The device of any of examples 1-7, wherein: determining the estimated value of the at least one unknown electrical parameter comprising determining $$\hat{x}(k) = \Lambda(k)\hat{x}(k-1) + \frac{1}{\gamma}\Lambda(k)\Phi_k^T S(k)^\top N_k^{-1} y(k), \hat{x}(k)$$

is a matrix representation of a current estimated state of the power network and contains the estimated value of the at least one unknown electrical parameter, $\Lambda(k)=\gamma(\Phi_k^T S(k)^T N_k^{-1} S(k)\Phi_k+\gamma I)^{-1}$, $\hat{x}(k-1)$ is a matrix representation of the previous estimated state of the power network, $\gamma$ is an inertia parameter that represents how much the current estimated state of the power network can change from the previous estimated state of the power network, $\Phi_k$ is a matrix housing a linearization of power flow equations which represents how power flows in the power network, S(k) is a selection matrix that selects from $\Phi_k$ based on received electrical parameter values, $N_k$ is a matrix housing values that indicate accuracy of received electrical parameter values, I is an identity matrix, and y(k) is a vector containing the at least one electrical parameter value.

Example 9. The device of any of examples 1-8, wherein causing the at least one device within the power network to modify operation based on the estimated value of the at least one unknown electrical parameter comprises outputting the estimated value of the at least one unknown electrical parameter.

Example 10. A method comprising: receiving, by a power network management system comprising at least one processor, at least one electrical parameter value corresponding to at least one first location within a power network; determining, by the power network management system, based on the at least one electrical parameter value and a previous estimated state of the power network, an estimated value of at least one unknown electrical parameter, wherein the at least one unknown electrical parameter corresponds to a second location within the power network; and causing, by the power network management system, at least one device within the power network to modify operation based on the estimated value of the at least one unknown electrical parameter.

Example 11. The method of example 10, wherein determining the estimated value of the at least one unknown electrical parameter is not based on a probabilistic model of the network or pseudo-measurements of current electrical parameters.

Example 12. The method of any of examples 10-11, wherein determining the estimated value of the at least one unknown electrical parameter is based further on a linearization of power flow equations which represents how power flows in the power network.

Example 13. The method of any of examples 10-12, wherein determining the estimated value of the at least one unknown electrical parameter is further based on a respective at least one weighting value that represents the accuracy of the at least one electrical parameter value.

Example 14. The method of any of examples 10-13, wherein determining the estimated value of the at least one unknown electrical parameter comprises determining respective active and reactive power values for nodes in the power network.

Example 15. The method of any of examples 10-14, wherein receiving the at least one electrical parameter value comprises receiving a voltage magnitude, a real power value, and a reactive power value, each corresponding to the at least one first location.

Example 16. The method of any of examples 10-15, wherein receiving the at least one electrical parameter value comprises receiving a voltage angle corresponding to the at least one first location.

Example 17. The method of any of examples 10-16, wherein: determining the estimated value of the at least one unknown electrical parameter comprising determining $$\hat{x}(k) = \Lambda(k)\hat{x}(k-1) + \frac{1}{\gamma}\Lambda(k)\Phi_k^T S(k)^\top N_k^{-1} y(k), \hat{x}(k)$$

is a matrix representation of a current estimated state of the power network and contains the estimated value of the at least one unknown electrical parameter, $\Lambda(k)=\gamma(\Phi_k^T S(k)^T N_k^{-1} S(k)\Phi_k+\gamma I)^{-1}$, $\hat{x}(k-1)$ is a matrix representation of the previous estimated state of the power network, $\gamma$ is an inertia parameter that represents how much the current estimated state of the power network can change from the previous estimated state of the power network, $\Phi_k$ is a matrix housing a linearization of power flow equations which represents how power flows in the power network, S(k) is a selection matrix that selects from $\Phi_k$ based on received electrical parameter values, $N_k$ is a matrix housing values that indicate accuracy of received electrical parameter values, I is an identity matrix, and y(k) is a vector containing the at least one electrical parameter value.

Example 18. The method of any of examples 10-17, wherein causing the at least one device within the power network to modify operation based on the estimated value of the at least one unknown electrical parameter comprises outputting the estimated value of the at least one unknown electrical parameter.

Example 19. The device of any of examples 1-9, wherein determining the estimated value of the at least one unknown electrical parameter comprises: receive electrical measurements from at least one node in the network; compute a linearization of power flow equations which represents how power flows in the power network, based on the previous state estimate and on the system model, namely, the network topology and the line impedances, and on at least one electrical parameter, equations that specify relationships involving the at least one electrical parameter; compute S(k), $N_k$ and its inverse $N_k^{-1}$, and the term $S(k)\Phi_k$ based on the nodes that are reporting measurements; process the measurements by computing the term $$\frac{1}{\gamma}\Lambda(k)\Phi_k^T S(k)^\top N_k^{-1} y(k),$$

and compute the inertia term $\Lambda(k)\hat{x}(k-1)$.

Example 20. The method of any of examples 10-18, wherein determining the estimated value of the at least one unknown electrical parameter comprises: receive electrical measurements from at least one node in the network; compute a linearization of power flow equations which represents how power flows in the power network, based on the previous state estimate and on the system model, namely, the network topology and the line impedances, and on at least one electrical parameter, equations that specify relationships involving the at least one electrical parameter; compute $S(k)$, $N_k$ and its inverse $N_k^{-1}$, and the term $S(k)\Phi_k$ based on the nodes that are reporting measurements; process the measurements by computing the term $$\frac{1}{\gamma}\Lambda(k)\Phi_k^\top S(k)^\top N_k^{-1} y(k),$$

and compute the inertia term $\Lambda(k)\hat{x}(k-1)$.

The present disclosure provides techniques for state estimation for power distribution grids that are able to utilize asynchronous measurements by leveraging system inertia. Simulations on the standard IEEE-37 bus testbed are provided and show the effectiveness of the disclosed techniques.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
at least one processor configured to:
receive at least one electrical parameter value corresponding to at least one first location within a power network;
determine, based on the at least one electrical parameter value and a previous estimated state of the power network, an estimated value of at least one unknown electrical parameter, wherein the at least one unknown electrical parameter corresponds to a second location within the power network; and
cause at least one device within the power network to modify operation based on the estimated value of the at least one unknown electrical parameter, wherein:
determining the estimated value of the at least one unknown electrical parameter comprising determining $$\hat{x}(k) = \Lambda(k)\hat{x}(k-1) + \frac{1}{\gamma}\Lambda(k)\Phi_k^\top S(k)^\top N_k^{-1} y(k),$$

$\hat{x}(k)$ is a matrix representation of a current estimated state of the power network and contains the estimated value of the at least one unknown electrical parameter, $\Lambda(k) = \gamma(\Phi_k^T S(k)^T N_k^{-1} S(k)\Phi_k + \gamma I)^{-1}$, $\hat{x}(k-1)$ is a matrix representation of the previous estimated state of the power network, γ is an inertia parameter that represents how much the current estimated state of the power network can change from the previous estimated state of the power network, $\Phi_k$ is a matrix housing a linearization of power flow equations which represents how power flows in the power network, S(k) is a selection matrix that selects from $\Phi_k$ based on received electrical parameter values, $N_k$ is a matrix housing values that indicate accuracy of received electrical parameter values, I is an identity matrix, and y(k) is a vector containing the at least one electrical parameter value.

2. The device of claim 1, wherein determining the estimated value of the at least one unknown electrical parameter is based further on a linearization of power flow equations which represents how power flows in the power network.

3. The device of claim 1, wherein determining the estimated value of the at least one unknown electrical parameter is further based on a respective at least one weighting value that represents the accuracy of the at least one electrical parameter value.

4. The device of claim 1, wherein determining the estimated value of the at least one unknown electrical parameter comprises determining respective active and reactive power values for nodes in the power network.

5. The device of claim 1, wherein receiving the at least one electrical parameter value comprises receiving a voltage magnitude, a real power value, and a reactive power value, each corresponding to the at least one first location.

6. The device of claim 5, wherein receiving the at least one electrical parameter value further comprises receiving a voltage angle corresponding to the at least one first location.

7. The device of claim 1, wherein causing the at least one device within the power network to modify operation based on the estimated value of the at least one unknown electrical parameter comprises outputting the estimated value of the at least one unknown electrical parameter.

8. A method comprising:
receiving, by a power network management system comprising at least one processor, at least one electrical parameter value corresponding to at least one first location within a power network;
determining, by the power network management system, based on the at least one electrical parameter value and a previous estimated state of the power network, an estimated value of at least one unknown electrical parameter, wherein the at least one unknown electrical parameter corresponds to a second location within the power network; and
causing, by the power network management system, at least one device within the power network to modify operation based on the estimated value of the at least one unknown electrical parameter, wherein:
determining the estimated value of the at least one unknown electrical parameter comprising determining $$\hat{x}(k) = \Lambda(k)\hat{x}(k-1) + \frac{1}{\gamma}\Lambda(k)\Phi_k^\top S(k)^\top N_k^{-1} y(k),$$

$\hat{x}(k)$ is a matrix representation of a current estimated state of the power network and contains the estimated value of the at least one unknown electrical parameter, $\Lambda(k) = \gamma(\Phi_k^T S(k)^T N_k^{-1} S(k) \Phi_k + \gamma I)^{-1}$, $\hat{x}(k-1)$ is a matrix representation of the previous estimated state of the power network, γ is an inertia parameter that represents how much the current estimated state of the power network can change from the previous estimated state of the power network, $\Phi_k$ is a matrix housing a linearization of power flow equations which represents how power flows in the power network, S(k) is a selection matrix that selects from $\Phi_k$ based on received electrical parameter values, $N_k$ is a matrix housing values that indicate accuracy of received electrical parameter values, I is an identity matrix, and y(k) is a vector containing the at least one electrical parameter value.

9. The method of claim 8, wherein determining the estimated value of the at least one unknown electrical parameter is based further on a linearization of power flow equations which represents how power flows in the power network.

10. The method of claim 8, wherein determining the estimated value of the at least one unknown electrical parameter is further based on a respective at least one weighting value that represents the accuracy of the at least one electrical parameter value.

11. The method of claim 8, wherein determining the estimated value of the at least one unknown electrical parameter comprises determining respective active and reactive power values for nodes in the power network.

12. The method of claim 8, wherein receiving the at least one electrical parameter value comprises receiving a voltage magnitude, a real power value, and a reactive power value, each corresponding to the at least one first location.

13. The method of claim 12, wherein receiving the at least one electrical parameter value further comprises receiving a voltage angle corresponding to the at least one first location.

14. The method of claim 8, wherein causing the at least one device within the power network to modify operation based on the estimated value of the at least one unknown electrical parameter comprises outputting the estimated value of the at least one unknown electrical parameter.

* * * * *